US009160578B2

(12) United States Patent
Paker

(10) Patent No.: US 9,160,578 B2
(45) Date of Patent: Oct. 13, 2015

(54) TURBO EQUALISATION

(71) Applicant: Ericsson Modems SA, Le Grand-Saconnex (CH)

(72) Inventor: Özgün Paker, Eindhoven (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/409,568

(22) PCT Filed: Jun. 27, 2013

(86) PCT No.: PCT/EP2013/063576
§ 371 (c)(1),
(2) Date: Dec. 19, 2014

(87) PCT Pub. No.: WO2014/001481
PCT Pub. Date: Jan. 3, 2014

(65) Prior Publication Data
US 2015/0180682 A1 Jun. 25, 2015

Related U.S. Application Data

(60) Provisional application No. 61/667,004, filed on Jul. 2, 2012.

(30) Foreign Application Priority Data

Jun. 29, 2012 (EP) .................................... 12174386

(51) Int. Cl.
*H04L 25/03* (2006.01)
*H04L 25/02* (2006.01)
(Continued)

(52) U.S. Cl.
CPC ........ *H04L 25/03305* (2013.01); *H04B 7/0413* (2013.01); *H04L 1/0054* (2013.01); *H04L 25/0204* (2013.01); *H04L 25/03057* (2013.01)

(58) Field of Classification Search
CPC ................. H04L 25/03318; H04L 25/0246; H04L 25/03891; H04L 25/03216; H04L 25/03242; H04L 25/03305; H04L 25/03057; H04L 25/0204; H04L 1/0054; H04B 7/0413
See application file for complete search history.

(56) References Cited

U.S. PATENT DOCUMENTS 7,590,195 B2 * 9/2009 Wang et al. .................. 375/340
(Continued)

FOREIGN PATENT DOCUMENTS

JP    2008211800 A    9/2008
(Continued)

OTHER PUBLICATIONS

Jalden, J., et al., "Parallel Implementation of a Soft Output Sphere Decoder", Conference Record of the Thirty-Ninth Asilomar Conference on Signals, Systems and Computers, Oct. 28, 2005, pp. 581-585, IEEE.
(Continued)

*Primary Examiner* — Leon Flores
(74) *Attorney, Agent, or Firm* — Coats & Bennett, P.L.L.C.

(57) ABSTRACT

A receiver (200) for receiving for receiving encoded data transmitted simultaneously as a plurality of M different sequences of transmitted symbols from different transmit antennas using a plurality of m modulation levels, where M and m are integers and each of the transmitted symbols represents a plurality of bits of the encoded data, comprises a demodulator (210) arranged to provide N received symbol combinations by receiving at a plurality of N receive antennas (202, 204), where N is an integer, the plurality of M different sequences of transmitted symbols, wherein each received symbol combination comprises M simultaneously received ones of the transmitted symbols. An equalizer (230) is arranged to generate from the N received symbol combinations M pre-processed signals by performing interference cancellation, in which interference cancellation a different symbol of the respective received symbol combination is a wanted signal and the other symbols of the respective received symbol combination are interfering signals. The equalizer (230) is also arranged to generate from each of the M pre-processed signals a list of up to m initial candidate symbol combinations by, for each of the up to m initial candidate symbol combinations, selecting a first initial symbol indicative of a different one of the m modulation levels and selecting M−1 further initial symbols. The equalizer (230) is further arranged to generate from the lists of initial candidate symbol combinations an initial estimate of the transmitted symbols. A decoder (260) is arranged to decode bits represented by the initial estimate of the transmitted symbols.

17 Claims, 7 Drawing Sheets

(51) Int. Cl.
*H04L 1/00* (2006.01)
*H04B 7/04* (2006.01)

(56) References Cited

U.S. PATENT DOCUMENTS

| | | | |
|---|---|---|---|
| 7,895,503 B2* | 2/2011 | Walton et al. | 714/774 |
| 8,000,416 B2* | 8/2011 | Teo et al. | 375/341 |
| 8,462,867 B2* | 6/2013 | van Zelst et al. | 375/262 |
| 8,467,466 B2* | 6/2013 | Bjerke et al. | 375/262 |
| 8,681,901 B2* | 3/2014 | Yang et al. | 375/340 |
| 2004/0228423 A1 | 11/2004 | Gueguen | |
| 2006/0274836 A1 | 12/2006 | Sampath et al. | |
| 2007/0010957 A1 | 1/2007 | Sampath et al. | |
| 2008/0212720 A1 | 9/2008 | Abou Rjeily | |
| 2008/0240277 A1* | 10/2008 | Anholt et al. | 375/262 |

FOREIGN PATENT DOCUMENTS

| | | |
|---|---|---|
| KR | 20080025721 A | 3/2008 |
| KR | 20110092404 A | 8/2011 |
| WO | 2010112370 A2 | 10/2010 |

OTHER PUBLICATIONS

Dong, B., "A new Class of Soft MIMO Demodulation Algorithms", IEEE Transactions on Signal Processing, Nov. 1, 2003, pp. 2752-2763, vol. 51, Issue 11, IEEE.

Berardinelli, G., "Turbo Receivers for Single User MIMO LTE-A Uplink", IEEE 69th Vehicular Technology Conference, Apr. 26, 2009, pp. 1-5, IEEE.

Paker, O., et al., "A Low Cost Multi-standard Near-Optimal Soft-Output Sphere Decoder: Algorithm and Architecture", Design, Automation & Test in Europe Conference & Exhibition (DATE), Mar. 8, 2010, pp. 1402-1407, IEEE.

* cited by examiner

TURBO EQUALISATION

TECHNICAL FIELD

The present disclosure relates to a receiver and a method of operating a receiver for use in a Multiple Input Multiple Output (MIMO) communication system. The disclosure has application in, particularly but not exclusively, wireless communication systems operating in accordance with the Third Generation Partnership Project (3GPP) Long Term Evolution (LTE) protocol.

BACKGROUND

MIMO technology enables a high spectral efficiency to be obtained. This high spectral efficiency, measured in terms of bits per second per Hertz, has made MIMO technology attractive for many communication standards such as Long Term Evolution (LTE), LTE-Advanced, the Wireless Local Area Network (WLAN) standards Institution of Electrical and Electronic Engineers (IEEE) 802.11n, and WiMax, also known as IEEE 802.16e, for implementing the high data rate transmission in the range 100 Mbit·s$^{-1}$ to 1 Gbit·s$^{-1}$. In a communication system employing MIMO technology, data to be transmitted is divided into a plurality of data streams, and different data streams are transmitted from different transmit antennas at the same time in the same frequency band. The plurality of data streams intentionally interfere with each other, and a receiver for receiving the plurality of data streams has to separate the data streams from each other. The data streams comprise symbols, where a symbol is a signal representative of an integer number of binary digits, that is, bits. Typically, each symbol is representative of a plurality of bits.

An element of such a MIMO receiver that affects reception performance is an equaliser. The equaliser detects the plurality of received data streams and mitigates the effects of inter-symbol interference between different symbols transmitted simultaneously on the different data streams. A channel decoder, such as a turbo decoder, can then be used to recover bits of the transmitted data from the equalised symbols.

In a MIMO system with M transmit and N receive antennas, the received signal y can be expressed as an N dimensional received signal vector, $$y=Cs+n \qquad (1)$$

where s is an M-dimensional vector of symbols transmitted simultaneously from each of the M transmit antennas, C is a channel matrix with N rows and M columns, and n is an N-dimensional additive complex Gaussian noise vector. For the case of two transmit antennas, s=[s1, s2], where s1 is a first transmitted signal transmitted from a first one of the transmit antennas, and s2 is a second transmitted signal transmitted from a second one of the transmit antennas. Also, for the case of two receive antennas, y=[y11, y21], where y11 is the signal received at a first one of the receive antennas, and y21 is the signal received at a second one of the receive antennas. The symbols of s are chosen independently from a complex signal constellation of, for example, Quadrature Phase Shift Key (QPSK) modulation, 16-Quadrature Amplitude Modulation (16-QAM), or 64-Quadrature Amplitude Modulation (64-QAM). The symbols may be represented by complex numbers, each mapped to a unique bit pattern. For example, for QPSK modulation, a signal constellation of four symbols may be represented by the set of complex numbers {−1−i, −1+i, 1−i, 1+i}.

FIG. 1 illustrates a block schematic diagram of an example MIMO receiver 100. Referring to FIG. 1, the MIMO receiver 100 comprises a first receive antenna 102 and a second receive antenna 104, both of which are coupled to a demodulator 110 for demodulating signals received at the first and second receive antennas 102, 104. The signals received at the first and second receive antennas 102, 104 comprise the plurality of data streams transmitted simultaneously from different transmit antennas. The demodulated received signals are delivered to an input of a MIMO equaliser 130. A channel estimator 120 is coupled to the demodulator 110 and estimates, from the received signals, the characteristics of the communication channel between the transmit antennas and the receive antennas 102, 104. The channel estimator 120 delivers the estimated channel characteristics to the MIMO equaliser 130, and the MIMO equaliser 130 employs the estimated channel characteristics in detecting the symbols of the transmitted data streams. Each detected symbol comprises soft bits values, and the soft information may be provided as log-likelihood ratios (LLR). The detected symbols are de-scrambled by a de-scrambler 140 and de-interleaved in a de-interleaver 150, and the de-scrambled and de-interleaved symbols are decoded by a turbo decoder 160. The turbo decoder 160 delivers decoded bits at an output 162 of the MIMO receiver 100.

There is a requirement for improvements in receivers for use in MIMO systems.

SUMMARY

According to a first aspect there is provided a method of operating a receiver to receive encoded data transmitted simultaneously as a plurality of M different sequences of transmitted symbols from different transmit antennas using a plurality of m modulation levels, where M and m are integers and each of the transmitted symbols represents a plurality of bits of the encoded data, the method comprising:

providing N received symbol combinations by receiving at a plurality of N receive antennas, where N is an integer, the plurality of M different sequences of transmitted symbols, wherein each received symbol combination comprises M simultaneously received ones of the transmitted symbols;

generating from the N received symbol combinations M pre-processed signals by performing interference cancellation, in which interference cancellation a different symbol of the respective received symbol combination is a wanted signal and the other symbols of the respective received symbol combination are interfering signals;

generating from each of the M pre-processed signals a list of up to m initial candidate symbol combinations by, for each of the up to m initial candidate symbol combinations, selecting a first initial symbol indicative of a different one of the m modulation levels and selecting M−1 further initial symbols;

generating from the lists of initial candidate symbol combinations an initial estimate of the transmitted symbols; and decoding bits represented by the initial estimate of the transmitted symbols.

According to a second aspect there is provided a receiver for receiving encoded data transmitted simultaneously as a plurality of M different sequences of transmitted symbols from different transmit antennas using a plurality of m modulation levels, where M and m are integers and each of the transmitted symbols represents a plurality of bits of the encoded data, the receiver comprising:

a demodulator arranged to provide N received symbol combinations by receiving at a plurality of N receive antennas, where N is an integer, the plurality of M different sequences of transmitted symbols, wherein each received symbol combination comprises M simultaneously received ones of the transmitted symbols;

an equaliser arranged to:

generate from the N received symbol combinations M pre-processed signals by performing interference cancellation, in which interference cancellation a different symbol of the respective received symbol combination is a wanted signal and the other symbols of the respective received symbol combination are interfering signals;

generate from each of the M pre-processed signals a list of up to m initial candidate symbol combinations by, for each of the up to m initial candidate symbol combinations, selecting a first initial symbol indicative of a different one of the m modulation levels and selecting M−1 further initial symbols; and generate from the lists of initial candidate symbol combinations an initial estimate of the transmitted symbols; and a decoder arranged to decode bits represented by the initial estimate of the transmitted symbols.

Performing interference cancellation with different ones of the M symbols of the respective received symbol combination as a wanted signal and the other M−1 symbols of the respective received symbol combination as interfering symbols can enable each of the M symbols of the received symbol combination to be estimated. Generating from each of the M pre-processed signals a list of up to m initial candidate symbol combinations with the first initial symbol indicative of a different one of the m modulation levels can enable processing to be reduced by enabling the initial estimate of the transmitted symbols to be generated from, at most, M times m initial candidate symbol combinations.

Generating the M pre-processed signals from the N received symbol combination may comprise performing interference cancellation by, for each of the pre-processed signals:

generating a channel matrix of channel transfer function elements indicative of a channel transfer function between each of the transmit antennas and each of the receive antennas, wherein the channel transfer function elements are positioned in the channel matrix dependent on which of the symbols of the respective received symbol combination is the wanted signal;

performing QR decomposition of the channel matrix into a matrix Q having dimension N by M and for which $Q^{-1}=Q^H$, where $Q^H$ denotes a Hermitian transpose of Q, and an upper triangular matrix R having dimension M by M; and generating the respective pre-processed signal by multiplying a vector representative of the respective received symbol combination by $Q^H$;

and wherein the list of up to m initial candidate symbol combinations is generated, from each of the M pre-processed signals, dependent on the respective upper triangular matrix R.

Likewise, the equaliser may be arranged to generate the M pre-processed signals from the N received symbol combination by performing interference cancellation by, for each of the pre-processed signals:

generating a channel matrix of channel transfer function elements indicative of a channel transfer function between each of the transmit antennas and each of the receive antennas, wherein the channel transfer function elements are positioned in the channel matrix dependent on which of the symbols of the respective received symbol combination is the wanted signal;

performing QR decomposition of the channel matrix into a matrix Q having dimension N rows by M columns and for which $Q^{-1}=Q^H$, where $Q^H$ denotes a Hermitian transpose of Q, and an upper triangular matrix R having dimension M by M; and generating the respective pre-processed signal by multiplying a vector representative of the respective received symbol combination by $Q^H$;

and wherein the list of up to m initial candidate symbol combinations is generated, from each of the M pre-processed signals, dependent on the respective upper triangular matrix R.

Such manipulation of the channel matrix can enable the interference cancellation to be performed in a low complexity manner.

The method may comprise selecting the M−1 further initial symbols dependent on Euclidean distances of bits of each of the selected first and further initial symbols relative to the respective pre-processed signal from which the list of initial candidate symbol combinations is generated. Likewise, the equaliser may be arranged to select the M−1 further initial symbols dependent on Euclidean distances of bits of each of the selected first and further initial symbols relative to the respective pre-processed signal from which the list of initial candidate symbol combinations is generated. This feature can enable high reliability by enabling the quality of all bits represented by the symbols to be taken into account when selecting the further initial symbols of the initial candidate symbol combinations.

Selecting the M−1 further initial symbols may comprise minimising a sum of squares of the Euclidean distances of the bits of each of the selected first and further initial symbols relative to the respective pre-processed signal from which the list of initial candidate symbol combinations is generated. This feature can reduce complexity by avoiding square root operations.

Generating each of the M lists of up to m initial candidate symbol combinations may comprise including only initial candidate symbol combinations for which the minimised sum of squares of the Euclidean distances of the bits of each of the selected first and further initial symbols relative to the respective pre-processed signal from which the list of initial candidate symbol combinations is generated is less than a first threshold. Likewise, the equaliser may be arranged to generate each of the M lists of up to m initial candidate symbol combinations by including only initial candidate symbol combinations for which the minimised sum of squares of the Euclidean distances of the bits of each of the selected first and further initial symbols relative to the respective pre-processed signal from which the list of initial candidate symbol combinations is generated is less than a first threshold. This feature can enable complexity to be reduced by excluding initial candidate symbol combinations having a relatively low reliability.

The initial candidate symbol combinations may comprise a soft value for each bit represented by each symbol of each initial candidate symbol combination, and generating the initial estimate of the transmitted symbols may comprise merging the initial candidate symbol combinations dependent on the soft values of the initial candidate symbol combinations. Likewise, the initial candidate symbol combinations may comprise a soft value for each bit represented by each symbol of each initial candidate symbol combination, and the equaliser may be arranged to generate the initial estimate of the transmitted symbols by merging the initial candidate symbol combinations dependent on the soft values of the initial candidate symbol combinations. This feature can enable improved reliability of the initial estimate of the transmitted symbols.

The soft value for each bit represented by each symbol of each initial candidate symbol combination may be indicative of a minimum Euclidean distance of the respective bit relative to the respective pre-processed signal from which the list of initial candidate symbol combinations is generated, and merging the initial candidate symbol combinations may comprise selecting, for each bit represented by each symbol of the initial estimate of the transmitted symbols, the bits of the M lists of initial candidate symbol combinations for which the soft value is indicative of the smallest Euclidean distance. Likewise, in the receiver, the soft value for each bit represented by each symbol of each initial candidate symbol combination may be indicative of a minimum Euclidean distance of the respective bit relative to the respective pre-processed signal from which the list of initial candidate symbol combinations is generated, and the equaliser may be arranged to merge the initial candidate symbol combinations by selecting, for each bit represented by each symbol of the initial estimate of the transmitted symbols, the bits of the M lists of initial candidate symbol combinations for which the soft value is indicative of the smallest Euclidean distance. This feature can enable further improved reliability of the initial estimate of the transmitted symbols.

Decoding bits represented by the initial estimate of the transmitted symbols may comprise generating soft information for each of the bits represented by the initial estimate of the transmitted symbols. Likewise, the decoder may be arranged to generate soft information for each of the bits represented by the initial estimate of the transmitted symbols. This feature can enable improved reliability.

The soft information representative of each of the bits represented by the initial estimate of the transmitted symbols may be dependent on a square of a Euclidean distance of the respective bit, after decoding, from the respective pre-processed signal from which the respective initial symbol that represents the respective bit was selected. This feature can enable the soft information to have a high reliability.

The method may comprise:
generating from each of the M pre-processed signals a list of up to m secondary candidate symbol combinations by, for each of the secondary candidate symbol combinations, selecting a first secondary symbol indicative of a different one of the m modulation levels and selecting M−1 further secondary symbols dependent on the soft information;
generating from the M lists of secondary candidate symbol combinations a secondary estimate of the transmitted symbols; and
decoding bits represented by the secondary estimate of the transmitted symbols.

Likewise, the equaliser may be arranged to:
generate from each of the M pre-processed signals a list of up to m secondary candidate symbol combinations by, for each of the secondary candidate symbol combinations, selecting a first secondary symbol indicative of a different one of the m modulation levels and selecting M−1 further secondary symbols dependent on the soft information; and
generate from the M lists of secondary candidate symbol combinations a secondary estimate of the transmitted symbols;
and the decoder may be arranged to decode bits represented by the secondary estimate of the transmitted symbols.

This feature can enable improved reliability of the decoded bits by providing a further iteration of estimating the transmitted symbols, using the soft information resulting from the initial iteration, whilst enabling processing to be reduced by enabling the secondary estimate of the transmitted symbols to be generated from, at most, M times m secondary candidate symbol combinations.

Selecting the M−1 further secondary symbols may be dependent on Euclidean distances of bits of each of the selected first and further secondary symbols relative to the respective pre-processed signal from which the list of secondary candidate symbol combinations is generated. This feature can enable high reliability by enabling the quality of all bits represented by the symbols to be taken into account when selecting the further secondary symbols of the secondary candidate symbol combinations.

Selecting the M−1 further secondary symbols dependent on the soft information may comprise minimising a sum of: squares of Euclidean distances of bits of each of the selected first and further secondary symbols relative to the pre-processed signal from which the list of secondary candidate symbol combinations is generated; and the soft information representative of each of the bits represented by the initial estimate of the transmitted symbols. This feature can enable high reliability by enabling the quality of all bits represented by the symbols, and the soft information resulting from the initial iteration, to be taken into account when selecting the further secondary symbols of the secondary candidate symbol combinations.

Generating each of the M lists of up to m secondary candidate symbol combinations may comprise including only secondary candidate symbol combinations for which the minimised sum of squares of Euclidean distances of bits of each of the selected first and further secondary symbols relative to the pre-processed signal from which the list of secondary candidate symbol combinations is generated and the soft information representative of each of the bits represented by the initial estimate of the transmitted symbols is less than a second threshold. Likewise, the equaliser may be arranged to generate each of the M lists of up to m secondary candidate symbol combinations by including only secondary candidate symbol combinations for which the minimised sum of squares of Euclidean distances of bits of each of the selected first and further secondary symbols relative to the pre-processed signal from which the list of secondary candidate symbol combinations is generated and the soft information representative of each of the bits represented by the initial estimate of the transmitted symbols is less than a second threshold. This feature can enable complexity to be reduced by excluding secondary candidate symbol combinations having a relatively low reliability.

The secondary candidate symbol combinations may comprise a soft value for each bit represented by each symbol of each secondary candidate symbol combination, and generating the secondary estimate of the transmitted symbols may comprise merging the secondary candidate symbol combinations dependent on the soft values of the secondary candidate symbol combinations. Likewise, the secondary candidate symbol combinations may comprise a soft value for each bit represented by each symbol of each secondary candidate symbol combination, and the equaliser may be arranged to generate the secondary estimate of the transmitted symbols by merging the secondary candidate symbol combinations dependent on the soft values of the secondary candidate symbol combinations. This feature can enable improved reliability of the secondary estimate of the transmitted symbols.

The soft value for each bit represented by each symbol of each secondary candidate symbol combination may be indicative of a minimum Euclidean distance of the respective bit relative to the respective pre-processed signal from which the list of secondary candidate symbol combinations is generated, and merging the secondary candidate symbol combinations may comprise selecting, for each bit represented by each symbol of the secondary estimate of the transmitted symbols, the bits of the M lists of secondary candidate symbol combinations for which the soft value is indicative of the smallest Euclidean distance. Likewise, in the receiver, the soft value for each bit represented by each symbol of each secondary candidate symbol combination may be indicative of a minimum Euclidean distance of the respective bit relative to the respective pre-processed signal from which the list of secondary candidate symbol combinations is generated, and the equaliser may be arranged to merge the secondary candidate symbol combinations by selecting, for each bit represented by each symbol of the secondary estimate of the transmitted symbols, the bits of the M lists of secondary candidate symbol combinations for which the soft value is indicative of the smallest Euclidean distance. This feature can enable further improved reliability of the initial estimate of the transmitted symbols.

BRIEF DESCRIPTION OF THE DRAWINGS

Preferred embodiments will now be described, by way of example only, with reference to the accompanying drawings, in which.

DETAILED DESCRIPTION

Figure 1:
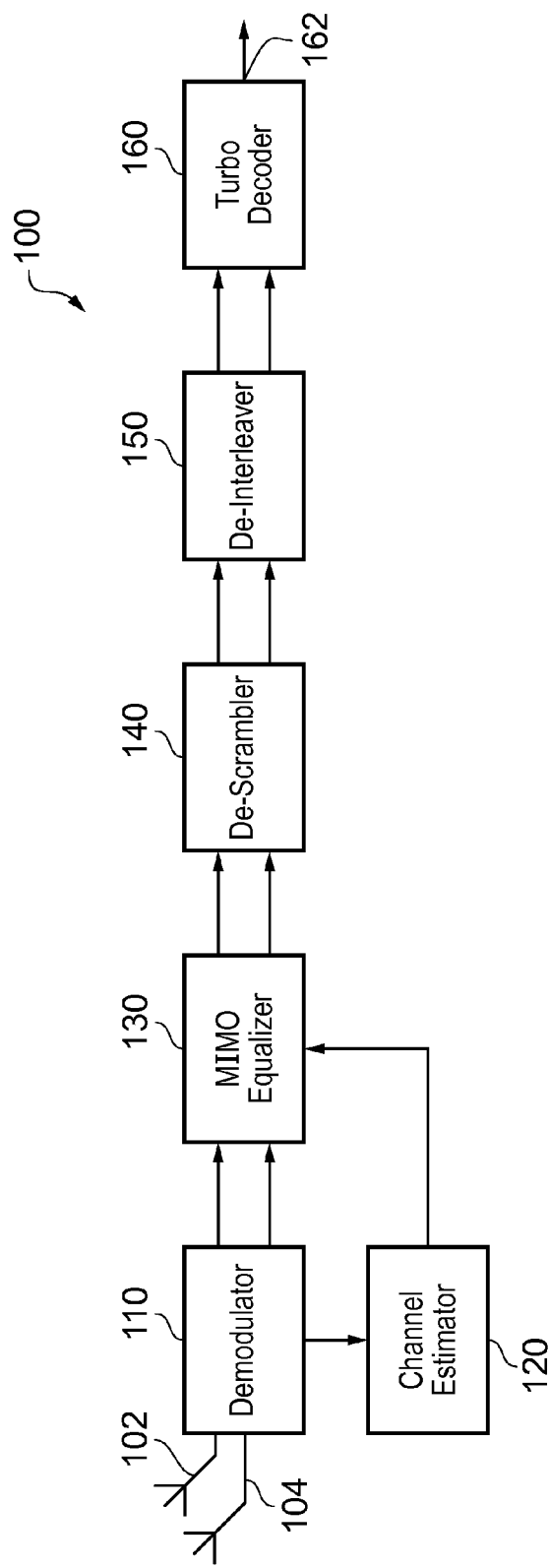
FIG. 1 illustrates a prior art receiver.
Figure 2:
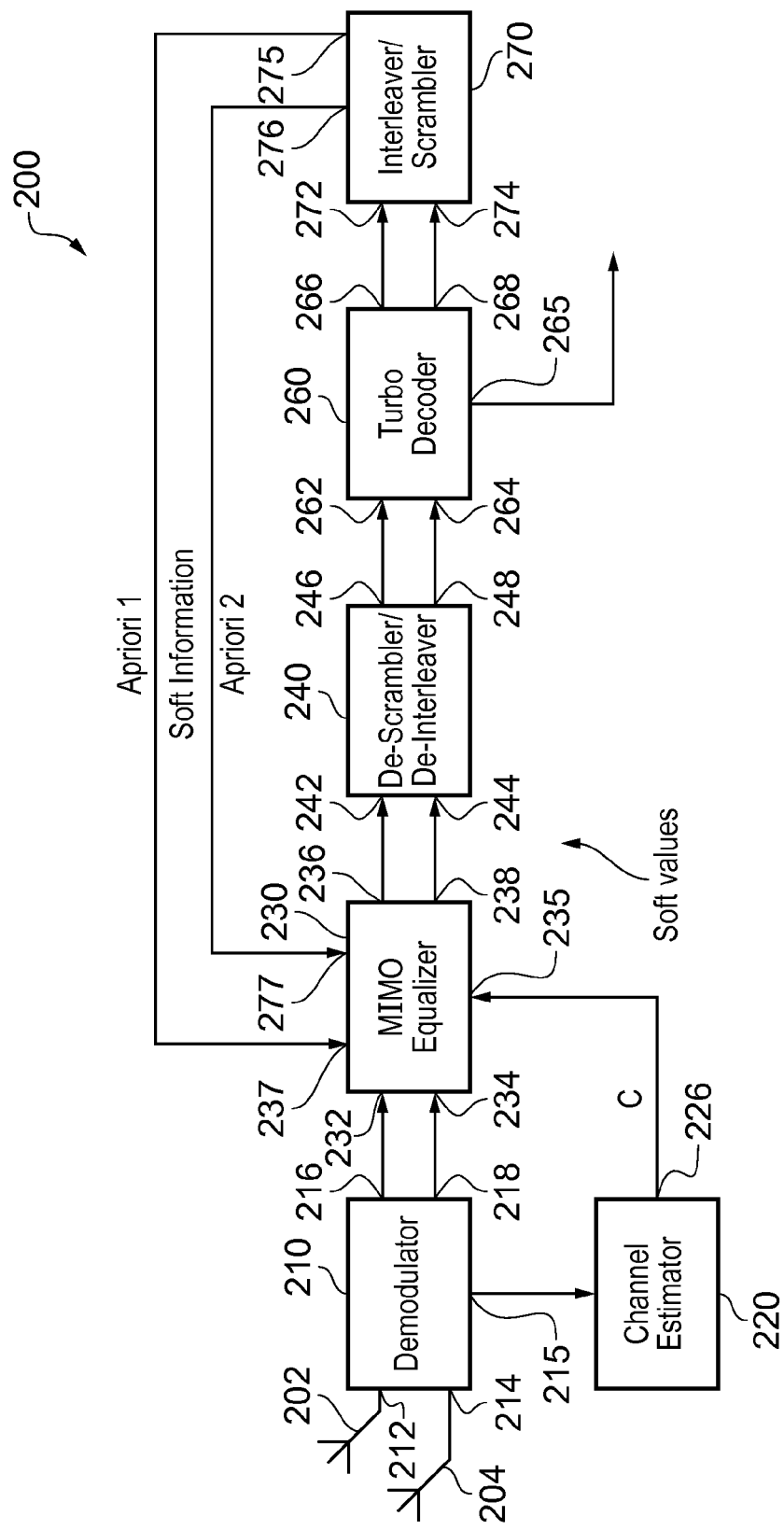
FIG. 2 is a block schematic diagram of a receiver.

FIG. 2 illustrates a block schematic diagram of a receiver 200 for use in a MIMO system, in which equalisation and channel decoding are done jointly. Such a combination of joint equalisation and channel decoding, and in particular turbo decoding, can be referred to as turbo equalisation. The receiver 200 is described below for the example case of receiving a first transmitted signal s1 transmitted from a first transmit antenna and a second transmitted signal s2 transmitted simultaneously from a second transmit antenna, corresponding to M=2. The first and second transmitted signals s1, s2 comprise, respectively, a first data stream and a second data stream, or more specifically, a first stream of symbols and a second stream of symbols, and each symbol represents one or a plurality of bits. In a MIMO system communicating a plurality of data streams, the different data streams and different transmitted signals may be referred to as different spatial layers. Therefore, in the present example, the first data stream and first transmitted signal s1 may be referred to as a first spatial layer, and the second data stream and second transmitted signal s2 may be referred to as a second spatial layer.

Referring to FIG. 2, a first receive antenna 202 is coupled to a first input 212 of a demodulator 210 and a second receive antenna 204 is coupled to a second input 214 of the demodulator 210. The first and second receive antennas 202, 204 both receive the transmitted vector of symbols s=[s1, s2], after transmission through a channel. A first output 216 and a second output 218 of the demodulator 210 both deliver the received signal y=[y11, y21], or more specifically the transpose of the vector y, that is $Y=y^T$, demodulated from the transmitted vector, or combination, of symbols s received at the first and second receive antennas 202, 204, where the received signal y is defined by equation (1).

The first output 216 of the demodulator 210 is coupled to a first input 232 of an equaliser 230, which may also be referred to as a MIMO equaliser or MIMO detector, and the second output 218 of the demodulator 210 is coupled to a second input of the equaliser 230. A third output 215 of the demodulator 210 is coupled to an input of a channel estimator 220 which estimates the channel matrix C of equation (1), and delivers the channel matrix C at an output 226 of the channel estimator 220 which is coupled to a third input 235 of the equaliser 230. The channel matrix C may be estimated from the received combinations of the symbols of the first and second data stream, or from reference symbols, such as pilots symbols, transmitted from the first and second transmit antennas. The equaliser 230 performs equalisation of the received signal y based on the channel matrix C, and generates a first list of initial candidate symbol combinations, or vectors, corresponding to the first transmitted signal s1, and generates a second list of initial candidate symbol combinations, or vectors, corresponding to the second transmitted signal s2. Each initial candidate symbol combination of the first and second lists consists of a plurality of candidate symbols, with each candidate symbol corresponding to a symbol of one of the M data streams transmitted by the M transmit antennas, in this example M having a value of two. Furthermore, each candidate symbol represents a plurality of bits having soft values. Generation of the lists and soft values, which soft values may be indicative of a minimum Euclidean distance of the respective bit relative to the respective pre-processed signal from which the list of initial candidate symbol combinations is generated, and which in particular may be log-likelihood ratios, is described below in more detail. The terms "distance" and "Euclidean distance" are alternatives, both referring to the Euclidean distance. Euclidean distance is a distance between two points where, herein, the points are in a signal space and one of the points represents a pre-processed signal and the other point represents a symbol, or the bits of a symbol. A symbol and the bits represented by the symbol are represented by a common point, such that the distance between a pre-processed signal and each of the bits of a symbol is the same as the distance between the pre-processed signal and the symbol.

The equaliser 230 merges, that is, combines, the first and second list of initial candidate symbol combinations, and delivers at a first output 236 of the equaliser 230 an initial estimate of the symbols of the first transmitted signal s1, and delivers at a second output 238 of the equaliser 230 an initial estimate of the symbols of the second transmitted signal s2.

The bits of the symbols of the first and second data streams are, prior to transmission from the M transmit antennas, interleaved and then scrambled. Therefore, in the receiver 200, continuing to refer to FIG. 2, the first and second outputs 236, 238 of the equaliser 230 are coupled to respective first and second inputs 242, 244 of a de-scrambler and de-interleaver 240 where the bits of the initial estimates of successive symbols of the first and second transmitted signals s1, s2 are de-scrambled and de-interleaved. The bits of the initial estimate of the symbols of the first transmitted signal s1, after de-scrambling and de-interleaving, are delivered at a first output 246 of the de-scrambler and de-interleaver 240, and the bits of the initial estimate of the symbols of the second transmitted signal s2, after de-scrambling and de-interleaving, are delivered at a second output 248 of the de-scrambler and de-interleaver 240.

The first and second outputs 246, 248 of the de-scrambler and de-interleaver 240 are coupled to respective first and second inputs 262, 264 of a turbo decoder stage 260. The turbo decoder stage 260 provides a first decoding process for decoding the bits of the initial estimate of the symbols of the first transmitted signal s1, and a second decoding process for decoding the bits of the initial estimate of the symbols of the second transmitted signal s2, and delivers the decoded bits at a data output 265 of the turbo decoder stage 260. The turbo decoder stage 260 also generates soft information, that is, signal reliability information, for the decoded bits. The soft information may be dependent on a squared Euclidean distance of the respective bit, after decoding, from the respective pre-processed signal from which the respective initial symbol that represents the respective bit was selected, and in particular may be a log-likelihood ratio. The decoded bits of the initial estimate of the transmitted symbols of the first transmitted signal s1, including the corresponding first soft information denoted Apriori1, are delivered at a first output 266 of the turbo decoder stage 260, and the decoded bits of the initial estimate of the symbols of the second transmitted signal s2, including the corresponding second soft information denoted Apriori2, are delivered at a second output 268 of the turbo decoder stage 260.

The first and second outputs 266, 268 of the turbo decoder stage 260 are coupled to respective first and second inputs 272, 274 of an interleaver and scrambler 270 which interleaves and scrambles the decoded bits of the initial estimate of the symbols of the first transmitted signal s1, and interleaves and scrambles the decoded bits of the initial estimate of the symbols of the second transmitted signal s2. The resulting interleaved and scrambled bits, including the corresponding first soft information Apriori1, corresponding to the first spatial layer are delivered at a first output 275 of the interleaver and scrambler 270 that is coupled to a fourth input 237 of the equaliser 230, and the resulting interleaved and scrambled bits, including the corresponding second soft information Apriori2, corresponding to the second spatial layer are delivered at a second output 276 of the interleaver and scrambler 270 that is coupled to a fifth input 277 of the equaliser 230. The equaliser 230 employs these interleaved and scrambled bits, with the corresponding first and second soft information Apriori1, Apriori2, as a priori soft information for updating the first and second lists of initial candidate symbol vectors, as described below, thereby generating first and second lists of secondary candidate symbol combinations. The symbols of the first and second lists of secondary candidate symbol combinations are merged, in the same manner as described in relation to the first and second lists of initial candidate symbol combinations, to provide a secondary estimate of the transmitted symbols of the first transmitted signal s1 and a secondary estimate of the symbols of the second transmitted signal s2, which are delivered at, respectively, the first and second outputs 236, 238 of the equaliser 230.

After de-scrambling and de-interleaving by the de-scrambler and de-interleaver 240, the turbo decoder stage 260 applies the first decoding process to decode the bits of the secondary estimate of the symbols of the first transmitted signal s1, and the second decoding process to decode the bits of the secondary estimate of the symbols of the second transmitted signal s2, and delivers the decoded bits at a data output 265 of the turbo decoder stage 260, including the soft information. Updating the first and second lists of candidate symbol combinations by employing the decoded bits with corresponding first and second soft information Apriori1, Apriori2, and decoding the updated first and second lists of candidate symbol combinations, after merging, de-scrambling and de-interleaving, may be iterated to progressively increase the reliability of the decoded bits, for example, reducing a block error rate of bits or symbols. For the generation of the first and second lists of initial candidate symbol combinations, before the turbo decoder stage 260 has performed decoding, no soft information is available to the equaliser 230 from the turbo decoder stage 260, and so the equaliser 230 generates the first and second lists of initial candidate symbol combinations without using soft information, or with the first and second soft information Apriori1, Apriori2 set to zero.

Figure 6:
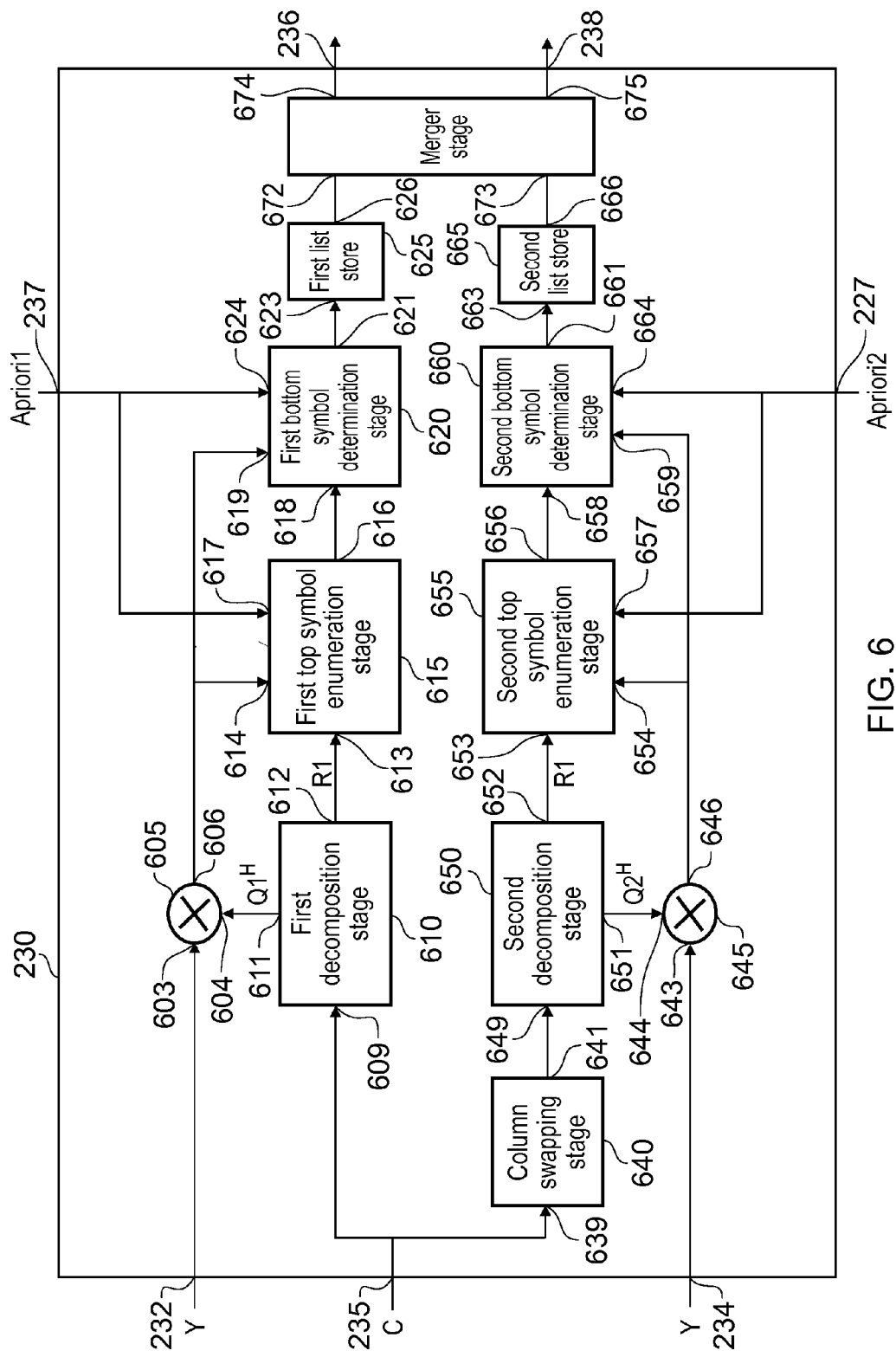
FIG. 6 is a block schematic diagram of an equaliser.

Referring to FIG. 6, the equaliser 230 comprises a first decomposition stage 610 having an input 609 coupled to the third input 235 of the equaliser 230 for receiving the channel matrix C. The first decomposition stage 610 performs QR decomposition of the channel matrix C for the first spatial layer, that is, the first transmitted signal s1, by decomposing the channel matrix C into a first Q matrix, Q1, and a first R matrix, R1, where C=Q1·R1, where Q1 is a matrix of dimension N by M having the property that $Q1^{-1}$ is equal to the Hermitian transpose of Q1, and where R1 is a matrix having dimension M by M that is upper triangular. The first decomposition stage 610 delivers at a first output 611 the Hermitian transpose of the first Q matrix, $Q1^H$, and at a second output 612 the first R matrix, R1. A first multiplier 605 has a first input 603 coupled to the first input 232 of the equaliser 230 for receiving the received signal y, or more specifically the transpose of y, that is $Y=y^T$, and a second input 604 coupled to the first output 611 of the first decomposition stage 610 which performs the rotation of the received signal y, delivering the product $Q1^H·y11$ at an output 606. The product $Q1^H·y11$ is referred to as a pre-processed signal, with the first decomposition stage 610 and the first multiplier 605 pre-processing the received signal y. This pre-processing, in effect, performs interference cancellation on the received signal y with the first transmitted signal s1 as a wanted signal and the second transmitted signal s2 as an interfering signal. More specifically, the pre-processing applies interference cancellation to each symbol combination of the received signal y, with the symbols of the first transmitted signal s1 as a wanted signal and the symbols of the second transmitted signal s2 as interfering signals. In this example, each of the candidate symbol combinations generated by the equaliser 230 has two symbols, as there are two transmitted signals s1 and s2, corresponding to two spatial layers. The two symbols of each of the candidate symbol combinations are referred to as a top symbol and a bottom symbol. A first top symbol enumeration stage 615 has a first input 613 coupled to the second output 612 of the first decomposition stage 610, and a second input 614 coupled to the output 606 of the first multiplier 605. The first top symbol enumeration stage 615 enumerates, that is, selects, the top symbol for each of the first initial candidate symbol combinations and first secondary candidate symbol combinations, and determines the soft values, for example in the form of LLRs, of the bits of these symbols. A first bottom symbol determination stage 620 has a first input 618 coupled to an output 616 of the first top symbol enumeration stage 615, and a second input 619 coupled to the output 606 of the first multiplier 605. The first bottom symbol determination stage 620 selects the bottom symbol of each of the first initial candidate symbol combinations and first secondary candidate symbol combinations, and determines the soft values, for example in the form of LLRs, of the bits of these symbols. The first bottom symbol determination stage 620 has a third input 624 coupled to the fourth input 237 of the equaliser 230 for receiving the first soft information Apriori1 generated by the turbo decoder stage 260, which it uses in determining the symbols of the first secondary candidate symbol combinations and the LLRs of the bits of these symbols, as described below. A first list store 625 has a first input 623 coupled to an output 621 of the first bottom symbol determination stage 620, and stores the list of first initial candidates symbol combinations, and subsequently the list of first secondary candidate symbol combinations, produced by the first top symbol enumeration stage 615 and the first bottom symbol determination stage 620, and the LLRs of the bits of these symbol combinations.

A column swapping stage 640 has an input 639 coupled to the third input 235 of the equaliser 230 for receiving the channel matrix C, and swaps the columns of the channel matrix C for selecting the second spatial layer, that is, the second transmitted signal s2, as the wanted signal for interference cancellation. Initially, the columns of the channel matrix may be arranged, for example, in order of increasing or decreasing signal to noise ratio (SNR) of the signals received at the respective receive antennas 202, 204. A second decomposition stage 650 has an input 649 coupled to an output 641 of the column swapping stage 640 and performs QR decomposition of the channel matrix C for the second spatial layer, that is, the second transmitted signal s2, by decomposing the channel matrix C into a second Q matrix, Q2, and a second R matrix, R2, where C=Q2·R2, where Q2 is a matrix of dimension N by M having the property that $Q2^{-1}$ is equal to the Hermitian transpose of Q2, and where R2 is a matrix having dimension M by M that is upper triangular. The second decomposition stage 650 delivers at a first output 651 the Hermitian transpose of the second Q matrix, $Q2^H$, and at a second output 652 the second R matrix, R2. A second multiplier 645 has a first input 643 coupled to the second input 234 of the equaliser 230 for receiving the received signal y, or more specifically the transpose of y, $Y=y^T$, and a second input 644 coupled to the first output 651 of the second decomposition stage 650 which performs the rotation of the received signal y, delivering the product $Q2^H \cdot y21$ at an output 646. A second top symbol enumeration stage 655 has a first input 653 coupled to the second output 652 of the second decomposition stage 650, and a second input 654 coupled to the output 646 of the second multiplier 645. The second top symbol enumeration stage 655 enumerates, that is, selects, the top symbol of each of the second initial candidate symbol combinations and second secondary candidate symbol combinations, and determines the soft values, for example in the form of LLRs, of the bits of these symbols. A second bottom symbol determination stage 660 has a first input 658 coupled to an output 656 of the second top layer enumeration stage 655, and a second input 659 coupled to the output 646 of the second multiplier 645. The second bottom symbol determination stage 660 selects the bottom symbols of each of the second initial candidate symbol combinations and second secondary candidate symbol combinations, and determines the soft values, for example in the form of LLRs, of the bits of these symbols. The second bottom symbol determination stage 660 has a third input 664 coupled to a fifth input 277 of the equaliser 230 for receiving the second soft information Apriori2 generated by the turbo decoder stage 260, which it uses in determining the symbols of the second secondary candidate symbol combinations and the LLRs of the bits of these symbols, as described below. A second list store 665 has a first input 663 coupled to an output 661 of the second bottom symbol determination stage 660, and stores the list of second initial candidates symbol combinations, and subsequently the list of second secondary candidate symbol combinations, produced by the second top symbol enumeration stage 655 and the second bottom symbol determination stage 660, and the LLRs of the bits of these symbol combinations.

A merger stage 680 has a first input 672 coupled to an output 626 of the first list store 625 and a second input 673 coupled to an output 666 of the second list store 665. The merger stage 680 merges the lists stored in the first and second list stores 625, 665, as described below, and delivers the initial estimate, and subsequently the secondary estimate, of the transmitted symbols of the first transmitted signal s1, corresponding to the first spatial layer, at a first output 674, and delivers the initial estimate, and subsequently the secondary estimate, of the transmitted symbols of the second transmitted signal s2, corresponding to the second spatial layer, at a second output 675. The first output 674 of the merger stage 680 is coupled to the first output 236 of the equaliser 230, and the second output 675 of the merger stage 680 is coupled to the second output 238 of the equaliser 230.

More generally, where there are M transmitted signals, the equaliser 230 has M signal paths supporting M spatial layers, comprising M−1 column swapping stages and M decomposition stages for performing interference cancellation with each of the M transmitted signals as the wanted signal, M top symbol enumeration stages, M bottom symbol enumeration stages and M list stores, arranged for generating and storing one list of candidate symbol combinations for each of the M transmitted signals. Correspondingly, the merger stage 680 is arranged to merge the M lists stored in the list stores, and deliver estimates of the transmitted symbols for each of the M transmitted signals. Moreover, each candidate symbol combination comprises M symbols, and so for the generation of each of the candidate symbol combinations, in addition to the top symbol enumeration stage 615 or 655, M−1 further symbol determination stages are required, including the bottom symbol determination stage 620 or 660.

The following paragraphs provide more details of the operation of the equaliser 230.

For each of the lists of candidate symbol combinations generated by the equaliser 230, each of the candidate symbol combinations are generated by selecting, in the respective first or second top symbol enumeration stage 615, 654, the top symbol as a different one of the m symbols which represent m modulation levels, and, in the respective first or second bottom symbol determination stage 620, 660, a bottom symbol such that the Euclidean distance of the candidate symbol combination from the respective pre-processed received signal y is minimised. Therefore, each of the lists of candidate symbol combinations can nominally comprise m candidate symbol combinations. However, the equaliser 230 can employ sphere decoding when selecting the top and bottom symbols, and more generally any further symbols of each candidate symbol combination when M>2, which can reduce the number of candidate symbol combinations below m. Moreover, the amount of processing required for the generation of the lists of candidate symbol combinations can be reduced by using tree pruning. In this case, the equaliser 230 generates the first and second lists of candidate symbols combinations, both initial and secondary, and any further iterations, by applying sphere decoding with tree pruning to the received signal y. The sphere decoding, tree pruning, generation of the soft values as LLRs, and the updating of the first and second lists of candidate symbols vectors by the equaliser 230 are described in the following paragraphs.

Sphere decoding limits the number of candidate symbol combinations to those that lie within an M-dimensional sphere of radius r around the received signal y, or more specifically the received signal y after the pre-processing for interference cancellation. This condition may be expressed in terms of a square of a Euclidean distance d(s) of a candidate symbol combination from the received signal y after the pre-processing, where $$d^2(s) = \|y - Cs\|^2 < r^2 \quad (2)$$

In order to determine those candidate symbol combinations that satisfy the condition of equation (2) without searching all possible candidate symbol combinations, that is $m^M$ candidate symbol combinations, where m is the number of modulation levels and corresponds to the number of points in the complex signal constellation, tree pruning is used.

Rewriting equation (2) using QR decomposition leads to:

$$d^2(s) = k + \|y' - Rs\|^2 < r^2 \quad (3)$$

where $y' = Q^H y$, and k is a constant that is independent of the symbol and can be ignored in the metric computation of the squared distance. The squared distance $d^2(s) = T_i(s^i)$ can be computed recursively as:

$$T_i(s^i) = T_{i+1}(s^{i+1}) + \left| b_{i+1} - R_{ii}s_i - \sum_{j=i+1}^{M} R_{ij}s_j \right|^2 \text{ for } i = 1, 2, \ldots M \quad (4)$$

In equation (4), $T_{M+1}(s^{M+1}) = 0$, $s^i = [s_i, s_{i+1}, \ldots s_M]^T$, and $R_{ij}$ denotes elements of the R matrix for row j and column i. All possible vectors $s^i$ and the respective path metrics $T_i(s^i)$ can be associated with nodes on the level of a tree, the root of which is at i=M+1. Since the second term of equation (4) is positive, whenever a path metric violates the sphere constraint given in (2), the path metrics of all the children will violate the constraint given in equation (2). Consequently the tree can be pruned above this node, or level. This approach effectively reduces the number of vector symbols, corresponding to leaves of the tree, to be checked. Equation (4) can be re-written as:

$$T_i(s^i) = T_{i+1}(s^{i+1}) + |b_{i+1} - R_{ii}s_i|^2 \quad (5)$$

where $$b_{i+1} = y' - \sum_{j=i+1}^{M} R_{ij}s_j.$$

The term $T_i(s^i)$ can also be referred to as the square of the Partial Euclidean Distance (PED), and is a metric representative of the partial symbol vector $s^i = [s_i, s_{i+1}, \ldots s_M]^T$, that is, the path taken from the root of the tree to the level. Once the search is done, that is, the vector with the smallest radius has been found, the resulting path from the root to leaf is the closest to the received signal y. The symbol vector corresponding to this path is the most likely (ML) transmitted symbol vector. The total Euclidean distance computed from the root to the leaf for the path of the ML transmitted symbol vector corresponds to minimum distance for the corresponding bit pattern that makes up the ML symbol vector. In other words, no other bit pattern that has the same bit value in one or more positions of the ML symbol vector can be closer to the received signal y.

Figure 3:
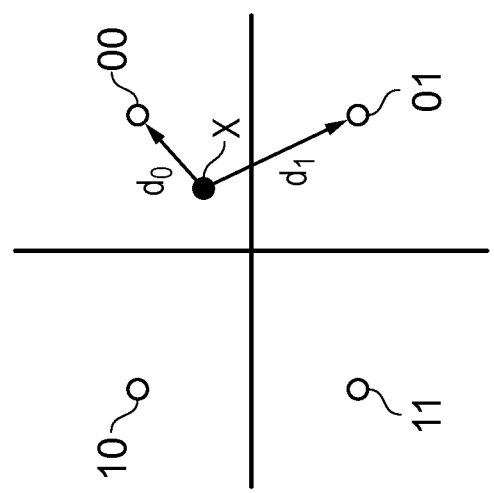
FIG. 3 illustrates a signal constellation for QPSK.
Figure 3:
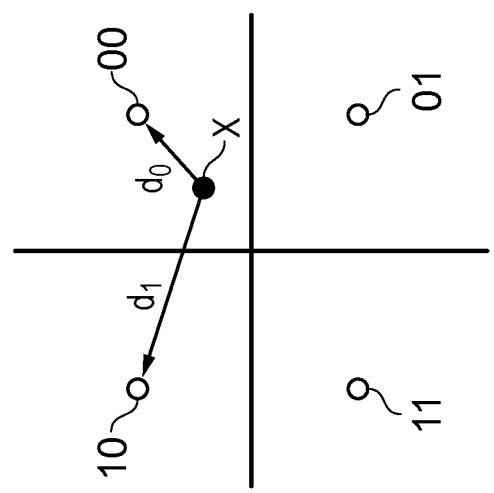

Computation of the soft values consist of computing the square of the minimum distance for each bit value 1 or 0 of each received symbol, and subtracting these squared distances and scaling with the signal-to-noise ratio. These soft values can be expressed as LLRs, dependent on minimum distances of the received symbols from the points of the complex signal constellation for each bit position and for each bit value. For example, referring to FIG. 3, a signal constellation [00, 01, 10, 11] is illustrated corresponding to QPSK. The point x represents a received and equalised symbol. The constellation on the left shows the minimum distance $d_0$ to the closest symbol, 00, that has a logic 0 for its first bit, and the minimum distance $d_1$ to the closest symbol, 10, that has a logic 1 for its first bit. Similarly, the constellation on the right shows the minimum distance $d_0$ to the closest symbol, 00, that has a logic 0 for its second bit, and the minimum distance $d_1$ to the closest symbol, 01, that has a logic 1 for its second bit. The difference between the square of the minimum distances $d_0$ and $d_1$ is a measure on the likelihood of the bit value, that is, the LLR, which can be expressed as:

$$LLR = \approx \frac{1}{\sigma^2}(d_0^2 - d_1^2) \quad (6)$$

where $\sigma^2$ is the noise power. For sphere decoding, the minimum distances for each bit position of each transmitted symbol are calculated for each bit value, based on equation (2), and the LLRs are calculated from the minimum distances using equation (6). The LLRs may be expressed in a more general form as follows:

$$LLR(b_{i,q}) = \frac{1}{\sigma^2} \left( \min_{V_0(i,q)} \|y - Cs\|^2 - \min_{V_1(i,q)} \|y - Cs\|^2 \right) \quad (7)$$

where $V_0(i,q)$, $V_1(i,q)$ are sets of all the symbol vectors with a bit value that is, respectively, 0 and 1 for transmit antenna i and bit position q within a particular symbol. Expressing the square of the minimum distance for a bit value 0 as $d_0^2(i,q) = \min_{V_0(i,q)} \|y - Cs\|^2$, and the square of the minimum distance for bit value 1 as $d_1^2(i,q) = \min_{V_1(i,q)} \|y - Cs\|^2$, equation (7) can be rewritten as:

$$LLR(b_{i,q}) = \frac{1}{\sigma^2}(d_0^2(i,q) - d_1^2(i,q))$$

In the receiver 200 described with reference to FIG. 2, where a-priori soft information, that is, an a-priori LLR, is available from the turbo decoder stage 260 for each bit, for example from a previous iteration of turbo decoding as described above, or even from a previous transmission in a Hybrid-Automated-Repeat Request (HARQ) protocol, the computation of LLRs by the equaliser 230 also takes account of these values appropriately for each bit, calculating the square of the distance values for a transmitted signal s as:

$$d^2(s) = \|y - Cs\|^2 - \sum_{i=1}^{M} \sum_{q=1}^{B} \log(p(s_{i,q})) \quad (8)$$

where M denotes the number of transmit antennas, B denotes the number of bits per symbol, for example B=6 for 64-QAM or B=2 for QPSK, $s_{i,q}$ denotes the bit position q of a symbol transmitted from the $i^{th}$ transmit antenna, corresponding to the $i^{th}$ spatial layer, and $\log(p(s_{i,q}))$ is a bit probability of $s_{i,q}$ in the log domain which can be computed from the a-priori LLRs using the formula $$\log(p(x)) = -\log(1 + e^{\pm LLR(x)}) \quad (9)$$

where LLR(x) denotes the log-likelihood of bit x, and the expression ±LLR(x) in the exponent has the negative sign if x refers to a bit value of 0, and the positive sign if x refers to a bit value of 1. In order to reduce processing, the summations in equation 8 may be approximated by using only the maximum element of the joint summation.

Therefore, the sphere decoding by the equaliser 230 does not merely use the channel matrix C and the received signal y to calculate LLRs but also takes account of the a-priori soft information that changes every iteration of the sphere decoding and turbo decoding. Consequently, the candidate symbol vectors computed in the first iteration of sphere decoding by considering only the channel matrix C and the received signal y may not, after the second iteration, lie inside the sphere after updating the distance values with the a-priori soft information for each bit as calculated using equation (8). A theoretical option is to maintain the LLRs for all the combinations of symbol combinations such that all possible bit combinations are stored. However, this option would be impractical to implement in an integrated circuit even for a simple MIMO system having two transmit antennas and two receive antennas. For example, for a 64-QAM modulation scheme, such as used in LTE, there would be the product 64 by 64=4096 candidate symbol combinations per subcarrier, and 1200 subcarriers must be processed in 0.71 µs, which would entail computing equation (8) about 68 billion times. Computing the first part of equation (8), that is, excluding the second part corresponding to the a-priori soft information, would require four complex multiply-and-accumulate instructions (MAC) per second, leading to an excessive requirement of 275 Giga complex MAC·$s^{-1}$. Leading edge vector digital signal processors (DSPs), such as the Embedded Vector Processor (EVP) manufactured by NXP Semiconductors, that can handle eight complex MACs per cycle would require a clock frequency of roughly 34 GHz per turbo equaliser iteration. In this case, even a single turbo-equaliser iteration is not practical, let alone 2 or 3. Another option is to perform a smart search and maintain a smaller list of candidate symbol combinations, but still try to capture all possible bit values for each bit position. However, some of the candidate symbol combinations based on the a-priori soft information from the turbo decoder stage 260 will have an increased distance as calculated using equation (8), and with the list size being fixed during iterations, the soft information may not always be accurate as potentially other symbol combinations that are not included in the initial list could contribute to LLR calculation more precisely if the a-priori soft information from the turbo decoder stage 260 causes their distances to shrink such that they are eligible to enter the list. Therefore, the equaliser 230 can employ a dynamic list for sphere decoding, where candidate symbol combinations, or in other words candidate symbol vectors, are re-assessed at each iteration, and some of them may be dropped out of the list, and some new candidates may be introduced to the list, depending on the distance contributions of the a-priori soft information of each bit. A replacement mechanism for the equaliser 230 to maintain the list of most likely candidate symbol combinations over iterations of such dynamic list based turbo-equaliser sphere decoding is described below. The replacement mechanism aims to ensure that each member of the list of candidate symbol combinations used for calculating the soft values, that is, the LLRs, that are delivered from the equaliser 230 to the turbo decoder stage 260 is the closest symbol combination around the received signal y for a particular bit position and bit value. The replacement mechanism employs the a-priori soft information that the turbo decoder stage 260 delivers to the equaliser 230.

In brief, after updating the distances of the candidate symbol combinations in the first or second, or further, list store 625, 665 with the a-priori soft information from the turbo decoder stage 260, by computing equation (8) in the first or second bottom, or further, symbol determination stages 620, 660, the K candidate symbol combinations, K<$m^M$, that have the largest distance are assessed by the equaliser 230 for replacement by up to K potential candidate symbol combinations that are not already in the respective list but which are closer to the received signal y than the K candidate symbol combinations. In one example, where there are two transmit antennas using QPSK modulation and the receiver 200 has two receive antennas, there are two spatial layers to be decoded, and K may have a value of two for each spatial layer. More generally, K may have a value equal to m/2, that is, half of the number of modulation levels, or half of the number of different available transmitted symbols. The potential candidate symbol combinations for each spatial layer are computed based on a-priori soft information for each spatial layer, provided to the equaliser 230 by the turbo decoder stage 260, and are compared to the candidate symbol combinations, in the current respective list, having the largest Euclidean distance, or squared Euclidean distance, from the receive signal y, and the candidate symbol combinations in the current respective list having a larger Euclidean distance, or squared Euclidean distance than the potential candidate symbol combinations are replaced by the potential candidate symbol combinations having a smaller distance.

The equaliser 230 maintains an independent search tree for each spatial layer, and a dynamic list of candidate symbol combinations for each of the search trees, in the respective first and second, or further, list store 625, 665. For the example of QPSK modulation and two spatial layers, the list of candidate symbol combinations can consist of four candidate symbol combinations per spatial layer, so for two spatial layers, a total of eight candidate symbol combinations are employed. In addition, if two potential candidate symbol combinations per spatial layer are considered, that is, K=2, a total of twelve candidate and potential candidate symbol combinations are assessed.

As another example, in the case of 64-QAM modulation, the list of candidate symbol combinations can consist of 64 candidate symbol combinations per spatial layer, and 32 potential candidate symbol combinations can be considered per spatial layer, resulting in a total of 192 candidate and potential candidate symbol combinations for two spatial layers. If the list of candidate symbol combinations were to consist of all possible candidate symbol combinations, for the two spatial layers a total of $64^2$=4096 candidate symbol combinations would need to be stored and processed. Therefore, the dynamic list technique disclosed herein is about twenty times less complex for this example of 64-QAM and can feasibly be implemented in dedicated hardware.

Figure 4:
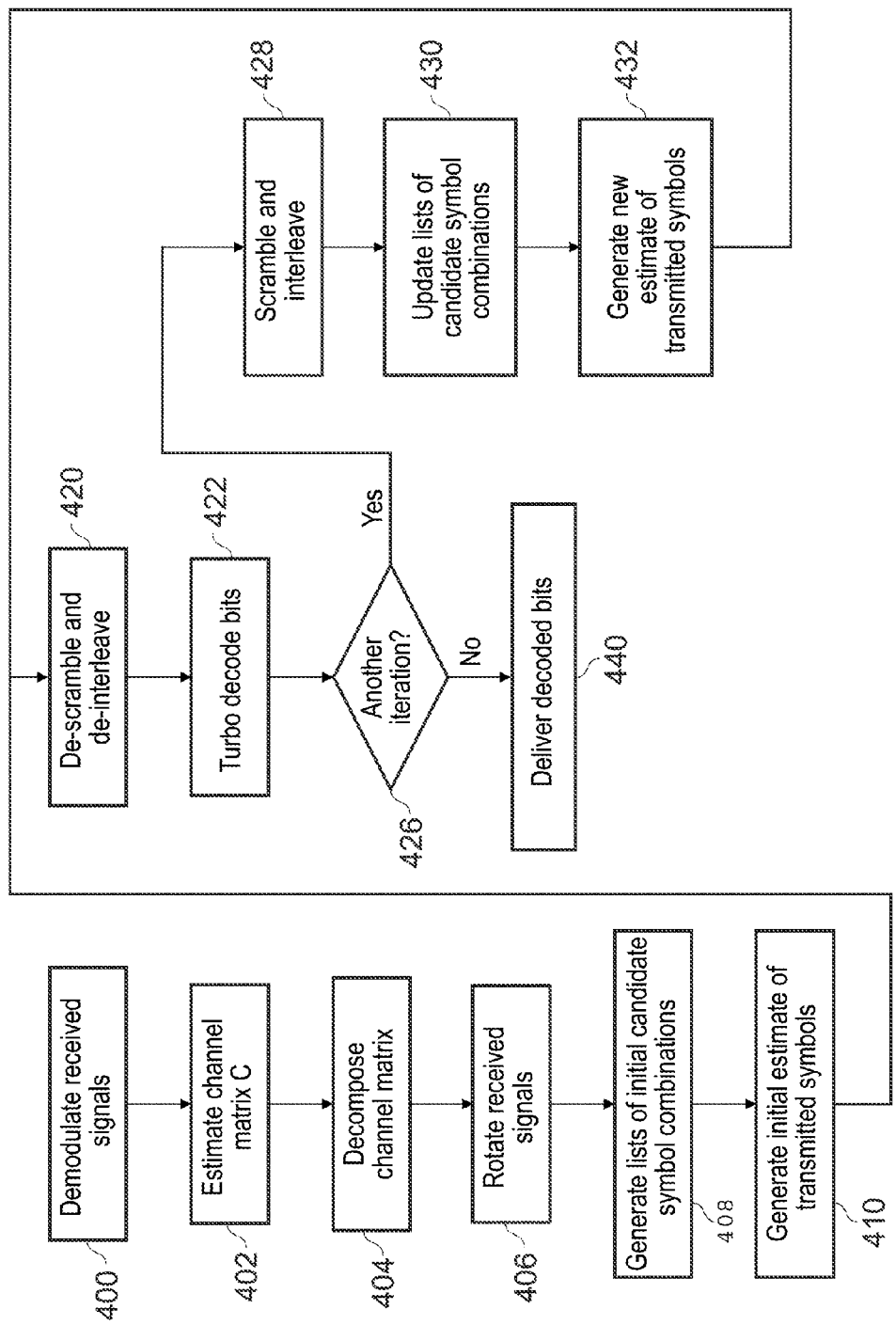
FIG. 4 is a flow chart of a method of processing a received signal.

Referring to FIG. 4, there is illustrated a method of operating the receiver 200 which has two receive antennas 202, 204, that is, N=2 and which is used for receiving independent data streams transmitted from two transmit antennas, that is, M=2. The method commences at step 400 in which the demodulator 210 demodulates the first and second transmitted signals s1, s2 to provide the received signal y, represented by the received signal vector y=[y11, y21]. At step 402, the channel estimator 220 estimates the channel matrix C.

At step 404, the QR decomposition of the channel matrix C is performed for the first spatial layer, to provide the first Q matrix, Q1, and the first R matrix, R1, and for the second spatial layer, to provide the second Q matrix, Q2, and the second R matrix, R2, but in this case with the columns of the channel matrix C swapped.

At step 406, the received signal y is pre-processed for the first spatial layer by multiplying, or rotating, it by the Hermitian transpose of the first Q matrix Q1, that is, multiplying by $Q1^H$. Likewise, also at step 406, the received signal y is pre-processed for the second spatial layer by multiplying, or rotating, it by the Hermitian transpose of the second Q matrix Q2, that is, multiplying by $Q2^H$. The pre-processing therefore results in the pre-processed received signal $y'=Q^H y$ At step 408, a first search tree is generated by, based on equation (3), computing the squared distance $\|Q1^H \cdot y - R1 \cdot s\|^2$ and eliminating those symbol combinations exceeding the square of the radius r, that is, exceeding a threshold equal to $r^2$. Computation of the squared distance can employ equation (5), with Q1 replacing Q and R1 replacing R. This results in a first search tree having a first, that is, top, level corresponding to the first spatial layer and a second level, in this example the bottom level, corresponding to the second spatial layer. In this first search tree all m symbols at the top level are enumerated. There is no need for symbol ordering at the top level as all possible options for the top level are used. To generate the bottom level, only the symbol, in this example the QPSK symbol, that has the smallest square of the partial Euclidean distance (PED) as computed using equation (5), or equivalently the smallest PED, is included in the first search tree. This significantly reduces the search space. All the paths of the first search tree, from the root to the leaves of the first search tree, which in this example are symbol pairs, form the first list of initial candidate symbol combinations, and each initial candidate symbol combination has an associated bit pattern, made up from the bits of the symbols of the respective initial candidate symbol combination, and a Euclidean distance from the pre-processed signal y', from which the LLR of each bit of each symbol is calculated. Also at step 408, a second search tree is generated by, based on equation (3), computing the squared distance $\|Q2^H \cdot y - R2 \cdot s\|^2$ and eliminating those transmitted symbol combinations exceeding the square of the radius r, that is, exceeding the threshold equal to $r^2$. Although in this example the same threshold is applied at step 408 for generating the first and second search trees, this is not essential and different threshold may be applied. Computation of the squared distance can employ equation (5), with Q2 replacing Q and R2 replacing R. This results in a second search tree having a first, that is, top, level corresponding to, due to the swapping of columns of the channel matrix C, the second spatial layer and a second level, in this example the bottom level, corresponding to the first spatial layer. In this second search tree all m symbols at the top level are enumerated. Again, there is no need for symbol ordering as all possible options for the top level are used. To generate the bottom level, only the symbol, in this example the QPSK symbol, that has the smallest square of the partial Euclidean distance (PED) as computed using equation (5), or equivalently the smallest PED, is included in the second search tree. This significantly reduces the search space. All the paths of the second search tree, from the root to the leaves of the second search tree, which in this example are symbol pairs, form the second list of initial candidate symbol combinations, and each initial candidate symbol combination has an associated bit pattern, made up from the bits of the symbols of the respective initial candidate symbol combination, and a Euclidean distance from the pre-processed signal y' from which the LLR of each bit of each symbol is calculated. The first and second lists of initial candidate symbol combinations, including the soft values of their bits, in the form of LLRs, are stored in, respectively, the first list store 625 and the second list store 665.

Figure 5:
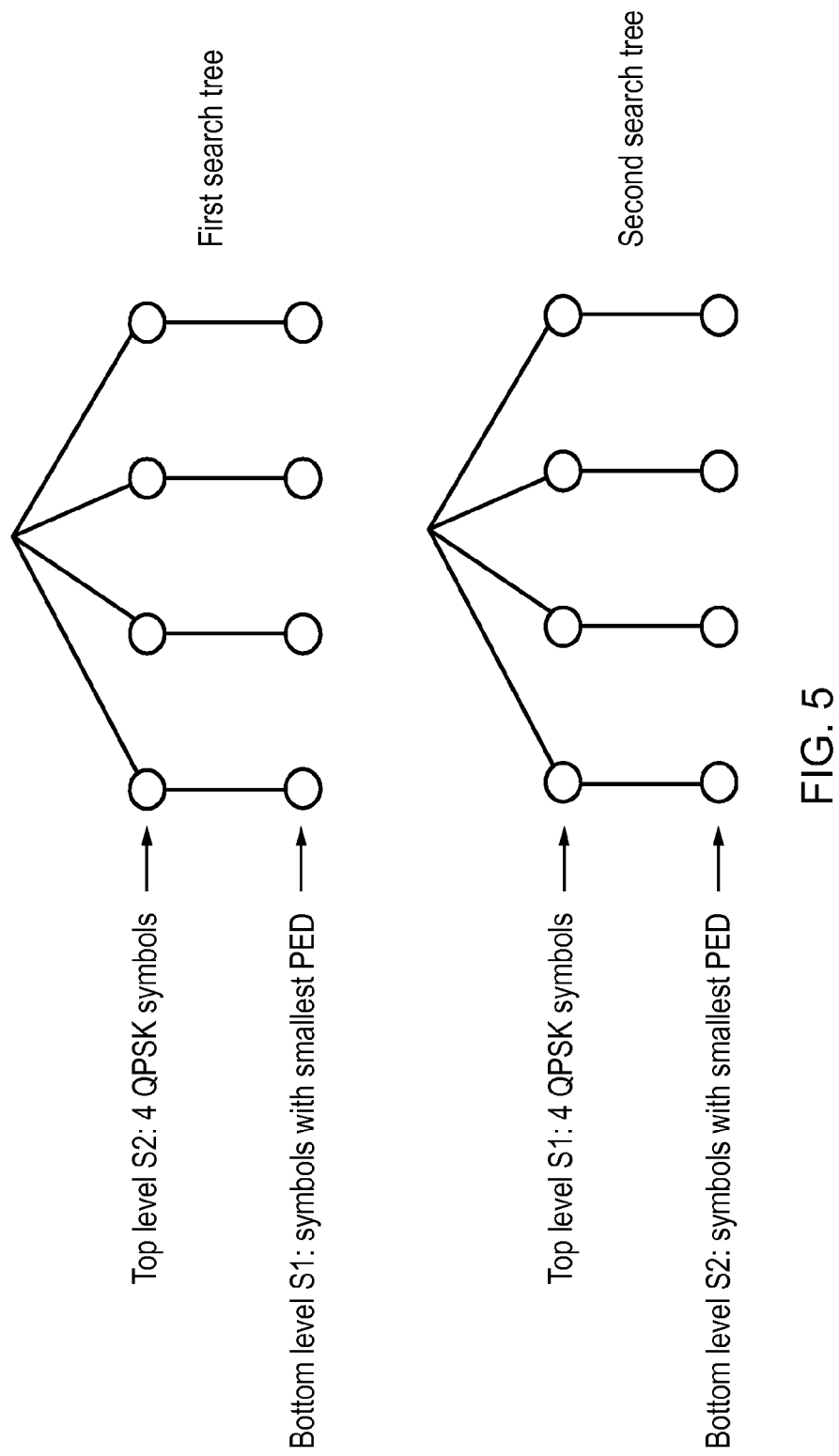
FIG. 5 is a diagrammatic representation of a search tree.

An example of the first and second search tree is shown in FIG. 5. The top level of the first search tree consists of the four possible QPSK symbols of the first spatial layer, and the second, that is, bottom, level of the first search tree consists of the symbols of the second spatial layer that result in the top and bottom level symbol pair having the smallest PED from the pre-processed signal y'. The top level of the second search tree consists of the four possible QPSK symbols of the second spatial layer, and the second, that is, bottom, level of the second search tree consists of the symbols of the second spatial layer that result in the top and bottom level symbol pair having the smallest PED from the pre-processed signal y'.

At step 410, the initial estimate of the transmitted symbols is generated from the first and second lists of initial candidate symbol combinations by merging, in the merger stage 680, the first and second lists of initial candidate symbol combinations dependent on the soft values of the bits represented by the symbols of the first and second lists of initial candidate symbol combinations. In particular, the merging comprises selecting, for each bit represented by each symbol of the initial estimate of the transmitted symbols, the bits of the first and second lists of initial candidate symbol combinations for which the soft values are indicative of a smallest minimum distance. More generally, where there are M transmitted signals, there are M lists of the initial candidate symbol combinations, and the initial estimate of the transmitted symbols is generated by merging these M lists.

At step 420, the bits of the initial estimate of the transmitted symbols are descrambled and then de-interleaved, by the de-scrambler and de-interleaver 240.

At step 422, after the descrambling and de-interleaving, the turbo decoder stage 260 decodes the bits represented by the initial estimate of the transmitted symbols to provide initial decoded bits, thereby generating the soft information for the bits represented by the first transmitted signal s1, which is referred to as first a-priori soft information, Apriori1, and the soft information for the bits represented by the second transmitted signal s2, which is referred to as second a-priori soft information, Apriori2.

At step 426, a test is performed to determine whether a further iteration of turbo equalisation is required, and if so, at step 428 the initial decoded bits are interleaved and then scrambled by the interleaver and scrambler 270.

At step 430 the equaliser 230, employs the first and second a-priori soft information Apriori1, Apriori2 to update the first and second lists of initial candidate symbol combinations to provide first and second lists of secondary candidate symbol combinations. The update may comprise replacing all of the initial candidate symbol combinations by newly calculated candidate symbol combinations. An alternative replacement criterion can be to replace only those initial candidate symbol combinations for which the distance values, calculated using equation 8, are smaller for the newly calculated candidate symbol combinations. A further replacement criterion may be, as described above, to replace up K, where K an integer, initial candidate symbol combinations in each of the first and second lists having the greatest distance values, calculated using equation 8, by the newly calculated candidate symbol combinations which have a smaller distance.

Selection of symbols for the first and second secondary candidate symbol combinations can be based on the a-priori soft information Apriori1, Apriori2, by creating a bit pattern based on the sign of the a-priori soft information, and then mapping the bit pattern to a symbol value. For example, a positive value can be interpreted as a binary 0, and a negative value can be interpreted as a binary 1. In this case, if for example the a-priori soft information is +1.5, −3.4, a symbol having bits 0,1 is added to the bottom level of the appropriate first or second search tree, resulting in a decoded symbol vector having this symbol at the bottom level being assessed according to the replacement criterion described above.

At step 432, the secondary estimate of the transmitted symbols is generated from the first and second lists of secondary candidate symbol combinations by merging, in the merger stage 680, the first and second lists of secondary candidate symbol combinations dependent on the soft values of the bits represented by the symbols of the first and second lists of secondary candidate symbol combinations, in a corresponding manner to the merging at step 410.

Flow then returns to step 420 for descrambling and de-interleaving by the descrambler and de-interleaver 240, and the secondary estimate of the transmitted symbols is delivered to the turbo decoder stage 260 via the descrambler and de-interleaver 240 for decoding at step 422.

Figure 7:
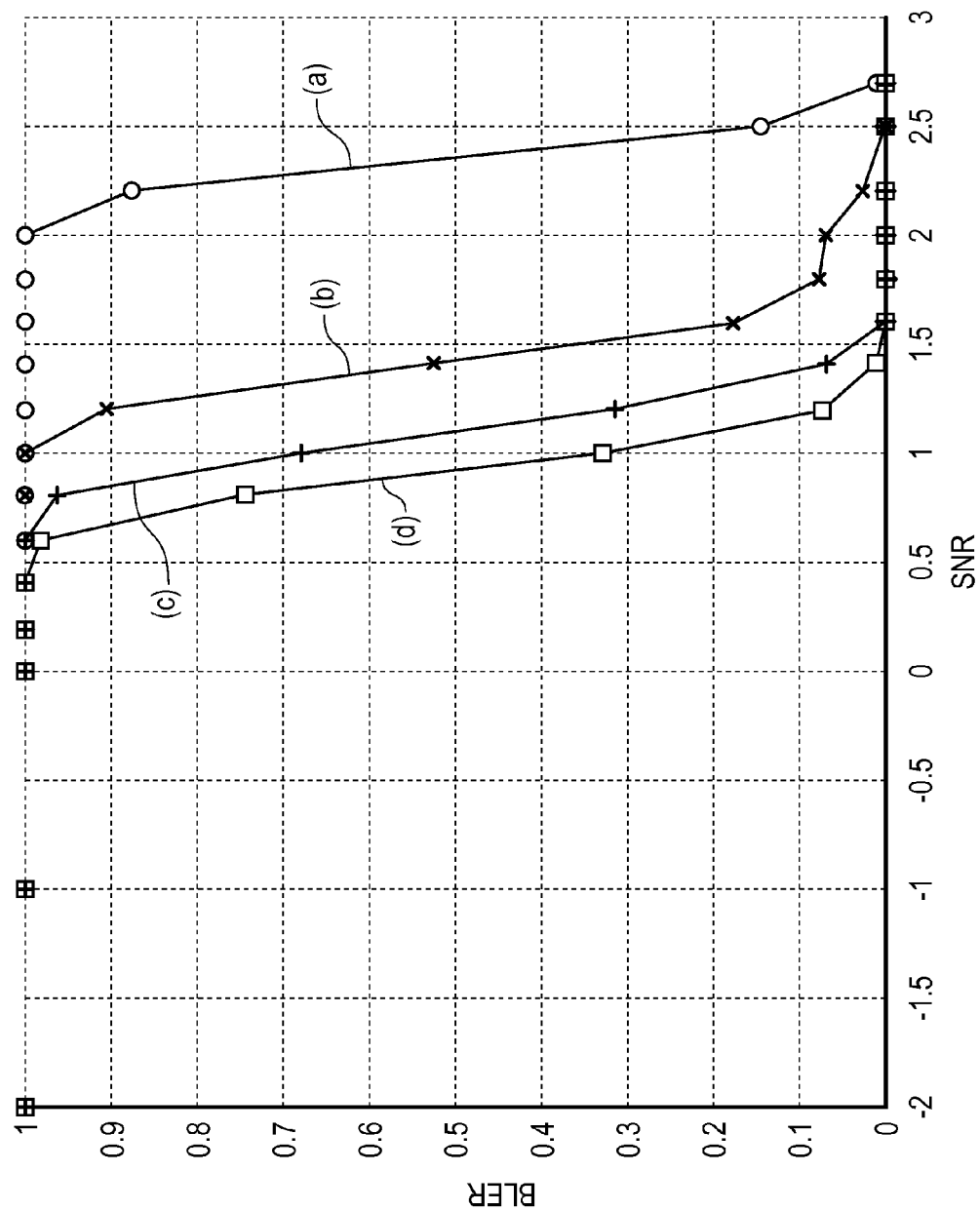
FIG. 7 is a graph illustrating improvements in block error rate.

If, at step 426, no further iterations of turbo equalisation are required, flow proceeds to step 440 where the decoded bits from the turbo decoder stage 260 is delivered. The loop comprising steps 428 to 432 followed by 420 to 426 may be repeated if desired, for example, generating first and second tertiary lists of candidate symbol combinations and a tertiary estimate of the transmitted symbols. FIG. 7, illustrates, as a function of signal-to-noise ratio (SNR), and for a deterministic channel with high correlation, the successive reduction in block error rate (BLER) for an increasing number of iterations of the turbo equalisation. In FIG. 7, graph (a) corresponds to the BLER without any feedback of a-priori soft information from the turbo decoder stage 260 to the equaliser 230, or with the a-priori soft information set to zero, and graphs (b), (c) and (d) shows the BLER for respectively, one, two and three iterations of steps 428 to 432 followed by 420 to 426. It can be seen from FIG. 7 that a single iteration of candidate replacement and subsequent turbo decoding of the amended lists of candidate symbol vectors can provide a reduction in SNR of about 1 dB, whilst further iterations provide a smaller improvement. A criterion for terminating the iterations at step 426 can be, for example, a fixed number of iterations, the lack of any replacements being made at step 432, or the lack of a change in the first and second a-priori soft information greater than a threshold.

Although embodiments have been described which employ turbo decoding, other types of channel decoding that produces a soft output may alternatively be employed, such as a Viterbi decoder or a Low-Density Parity-Check decoder.

Although embodiments have been described for the case of two transmit antennas, more transmit antennas may be used, corresponding to more spatial layers, and therefore requiring more search trees and more levels in the search trees. In this case, the equaliser 230 can comprise additional signal paths, in particular, correspondingly more column swapping stages, more decomposition stages, more multipliers for rotation, more top symbol enumeration stages, more symbol determination stages for determining the symbols at each level of the search tree, and more list stores. Similarly, although embodiments have been described for the case of two receive antennas, other numbers of receive antennas may be used.

Although embodiments have been described which employ sphere decoding to eliminate candidate symbol combinations having a distance, or squared distance, exceeding a threshold, it is not essential to employ sphere decoding, although omission of the sphere decoding can result in a greater number of candidate symbol combinations to be processed.

Although an approach to merging candidate symbol combinations to provide an estimate of the transmitted symbols has been described, alternative approaches to merging may be employed.

Although embodiments have been described in which the a-priori soft information is employed by the equaliser 230 for further processing, by candidate replacement in the first and second list stores 625, 665, of the same lists of candidate signal vectors, or combinations, from which the a-priori soft information is generated, in other embodiments, the a-priori soft information employed by the equaliser 230 for candidate replacement in the first and second list stores 625, 665, may be generated from a previous transmission of the same signal, for example, in an automatic repeat request (ARQ) protocol.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method of operating a receiver to receive encoded data transmitted simultaneously as a plurality of M different sequences of transmitted symbols from different transmit antennas using a plurality of m modulation levels, where M and m comprise integers and each of the transmitted symbols represents a plurality of bits of the encoded data, the method comprising:

providing N received symbol combinations by receiving, at a plurality of N receive antennas, the plurality of M different sequences of transmitted symbols, wherein each received symbol combination comprises M simultaneously received ones of the transmitted symbols, and wherein N comprises an integer;

generating, from the N received symbol combinations, M pre-processed signals by performing interference cancellation, in which interference cancellation a different symbol of a respective received symbol combination comprises a wanted signal and the other symbols of the respective received symbol combination comprise interfering signals;

generating, from each of the M pre-processed signals, a list of initial candidate symbol combinations, each of the M generated lists including up to m initial candidate symbol combinations, for each of the up to m initial candidate symbol combinations in each of the M generated lists, selecting a first initial symbol indicative of a different one of the m modulation levels and selecting M−1 further initial symbols;

generating, from the lists of initial candidate symbol combinations, an initial estimate of the transmitted symbols;

decoding bits represented by the initial estimate of the transmitted symbols; and generating M lists of secondary candidate symbol combinations by updating the corresponding M lists of initial candidate symbol combinations, wherein for each list of secondary candidate symbol combinations, the secondary candidate symbol combinations have smaller Euclidean distances than the initial candidate symbol combinations in the corresponding list of initial candidate symbol combinations, relative to the respective pre-processed signal.

2. The method as claimed in claim 1, wherein:
generating the M pre-processed signals from the N received symbol combination comprises performing interference cancellation by, for each of the pre-processed signals:
generating a channel matrix of channel transfer function elements indicative of a channel transfer function between each of the transmit antennas and each of the receive antennas, wherein the channel transfer function elements are positioned in the channel matrix dependent on which of the symbols of the respective received symbol combination is the wanted signal;
performing QR decomposition of the channel matrix into a matrix Q and a matrix R, the matrix Q comprising N rows and M columns and for which $Q^{-1}=Q^H$, where $Q^H$ denotes a Hermitian transpose of Q, and the matrix R comprising an upper triangular matrix having M rows and M columns; and
generating the respective pre-processed signal by multiplying a vector representative of the respective received symbol combination by $Q^H$; and
generating the list of up to m initial candidate symbol combinations comprises generating the list of up to m initial candidate symbol combinations, from each of the M pre-processed signals, dependent on the respective upper triangular matrix R.

3. The method as claimed in claim 1, further comprising selecting the M−1 further initial symbols dependent on Euclidean distances of bits of each of the selected first and further initial symbols relative to the respective pre-processed signal from which the list of initial candidate symbol combinations is generated.

4. The method as claimed in claim 3, wherein selecting the M−1 further initial symbols comprises minimizing a sum of squares of the Euclidean distances of the bits of each of the selected first and further initial symbols relative to the respective pre-processed signal from which the list of initial candidate symbol combinations is generated.

5. The method as claimed in claim 4, wherein generating each of the M lists of up to m initial candidate symbol combinations comprises including only initial candidate symbol combinations for which the minimized sum of squares of the Euclidean distances of the bits of each of the selected first and further initial symbols relative to the respective pre-processed signal from which the list of initial candidate symbol combinations is generated is less than a first threshold.

6. The method as claimed in claim 1, wherein the initial candidate symbol combinations comprise a soft value for each bit represented by each symbol of each initial candidate symbol combination, and wherein generating the initial estimate of the transmitted symbols comprises merging the initial candidate symbol combinations dependent on the soft values of the initial candidate symbol combinations.

7. The method as claimed in claim 6, wherein the soft value for each bit represented by each symbol of each initial candidate symbol combination is indicative of a minimum Euclidean distance of the respective bit relative to the respective pre-processed signal from which the list of initial candidate symbol combinations is generated, and wherein the merging comprises selecting, for each bit represented by each symbol of the initial estimate of the transmitted symbols, the bits of the M lists of initial candidate symbol combinations for which the soft value is indicative of the smallest Euclidean distance.

8. The method as claimed in claim 1, wherein decoding the bits represented by the initial estimate of the transmitted symbols comprises generating soft information for each of the bits represented by the initial estimate of the transmitted symbols.

9. The method as claimed in claim 8, wherein the soft information representative of each of the bits represented by the initial estimate of the transmitted symbols is dependent on a square of a Euclidean distance of the respective bit, after decoding, from the respective pre-processed signal from which the respective initial symbol that represents the respective bit was selected.

10. The method as claimed in claim 8, comprising:
generating the M lists of secondary candidate symbol combinations, from each of the M pre-processed signals, each of the M generated lists including up to m secondary candidate symbol combinations, for each of the up to m secondary candidate symbol combinations in each of the M generated lists, selecting a first secondary symbol indicative of a different one of the m modulation levels and selecting M−1 further secondary symbols dependent on the generated soft information;
generating, from the M lists of secondary candidate symbol combinations, a secondary estimate of the transmitted symbols; and
decoding bits represented by the secondary estimate of the transmitted symbols.

11. The method as claimed in claim 8, wherein updating the corresponding M lists of initial candidate symbol combinations further comprises calculating the secondary candidate symbol combinations by employing the decoded bits and the corresponding generated soft information.

12. The method as claimed in claim 10, further comprising selecting the M−1 further secondary symbols dependent on Euclidean distances of bits of each of the selected first and further secondary symbols relative to the respective pre-processed signal from which the list of secondary candidate symbol combinations is generated.

13. The method as claimed in claim 10, wherein selecting the M−1 further secondary symbols dependent on the soft information comprises minimizing the sum of:
squares of Euclidean distances of bits of each of the selected first and further secondary symbols relative to the pre-processed signal from which the list of secondary candidate symbol combinations is generated; and
the soft information representative of each of the bits represented by the initial estimate of the transmitted symbols.

14. The method as claimed in claim 13, wherein generating each of the M lists of up to m secondary candidate symbol combinations comprises including only secondary candidate symbol combinations for which the minimized sum of squares of Euclidean distances of bits of each of the selected first and further secondary symbols relative to the pre-processed signal from which the list of secondary candidate symbol combinations is generated and the soft information representative of each of the bits represented by the initial estimate of the transmitted symbols is less than a second threshold.

15. The method as claimed in claim 10, wherein the secondary candidate symbol combinations comprise a soft value for each bit represented by each symbol of each secondary candidate symbol combination, and wherein generating the secondary estimate of the transmitted symbols comprises merging the secondary candidate symbol combinations dependent on the soft values of the secondary candidate symbol combinations.

16. The method as claimed in claim 15, wherein the soft value for each bit represented by each symbol of each secondary candidate symbol combination is indicative of a minimum Euclidean distance of the respective bit relative to the respective pre-processed signal from which the list of secondary candidate symbol combinations is generated, and wherein the merging comprises selecting, for each bit represented by each symbol of the secondary estimate of the transmitted symbols, the bits of the M lists of secondary candidate symbol combinations for which the soft value is indicative of the smallest Euclidean distance.

17. A receiver for receiving encoded data transmitted simultaneously as a plurality of M different sequences of transmitted symbols from different transmit antennas using a plurality of m modulation levels, where M and m comprise integers and each of the transmitted symbols represents a plurality of bits of the encoded data, the receiver comprising:
  a demodulator configured to provide N received symbol combinations by receiving, at a plurality of N receive antennas, the plurality of M different sequences of transmitted symbols, wherein each received symbol combination comprises M simultaneously received ones of the transmitted symbols, and wherein N comprises an integer;
  an equalizer configured to:
    generate, from each of the received symbol combinations, M pre-processed signals by performing interference cancellation, in which interference cancellation a different symbol of the respective received symbol combination comprises a wanted signal and the other symbols of the respective received symbol combination comprise interfering signals;
    generate, from each of the M pre-processed signals, a list of initial candidate symbol combinations, each of the M generated lists including up to m initial candidate symbol combinations, for each of the up to m initial candidate symbol combinations in each of the M generated lists, selecting a first initial symbol indicative of a different one of the m modulation levels and selecting M−1 further initial symbols;
    generate, from the lists of initial candidate symbol combinations, an initial estimate of the transmitted symbols;
  a decoder configured to decode bits represented by the initial estimate of the transmitted symbols;
  wherein the equalizer is further configured to generate M lists of secondary candidate symbol combinations by updating the corresponding M lists of initial candidate symbol combinations, wherein for each list of secondary candidate symbol combinations, the secondary candidate symbol combinations have smaller Euclidean distances than the initial candidate symbol combinations in the corresponding list of initial candidate symbol combinations, relative to the respective pre-processed signal.

* * * * *